(12) United States Patent
Lee

(10) Patent No.: US 7,073,848 B2
(45) Date of Patent: Jul. 11, 2006

(54) COUPLING STRUCTURE FOR AIR GUIDE OF FRONT-END MODULE

(75) Inventor: Young-ho Lee, Gyunggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 71 days.

(21) Appl. No.: 10/973,342

(22) Filed: Oct. 27, 2004

(65) Prior Publication Data

US 2005/0275248 A1    Dec. 15, 2005

(30) Foreign Application Priority Data

Jun. 11, 2004   (KR) ...................... 10-2004-0043177

(51) Int. Cl.
*B60J 7/00* (2006.01)
(52) U.S. Cl. ................. 296/193.09; 180/68.4
(58) Field of Classification Search ........... 296/193.09, 296/203.02, 29; 180/68.4
See application file for complete search history.

(56) References Cited

U.S. PATENT DOCUMENTS

| | | | |
|---|---|---|---|
| 3,692,354 A * | 9/1972 | Tuerk ......................... 296/36 |
| 5,542,489 A * | 8/1996 | Allison et al. ............. 180/68.5 |
| 5,558,310 A * | 9/1996 | Furuie et al. .............. 180/68.4 |
| 5,944,341 A * | 8/1999 | Kimura et al. ........... 280/728.3 |
| 6,139,094 A * | 10/2000 | Teply et al. .................. 296/29 |
| 6,234,591 B1 * | 5/2001 | Driscoll et al. ............. 312/9.56 |
| 6,276,740 B1 * | 8/2001 | Mellor et al. .................. 296/72 |
| 6,305,465 B1 * | 10/2001 | Uchikawa et al. .......... 165/140 |
| 6,334,642 B1 * | 1/2002 | Waldeck et al. ....... 296/203.01 |
| 6,474,727 B1 * | 11/2002 | Guyomard ............. 296/193.09 |
| 6,615,604 B1 * | 9/2003 | Neufang ....................... 62/298 |
| 6,749,360 B1 * | 6/2004 | Abels ......................... 403/381 |
| 6,857,681 B1 * | 2/2005 | Nakajima ..................... 296/70 |
| 6,904,958 B1 * | 6/2005 | Ozaki et al. ............... 180/68.4 |
| 2001/0045761 A1 * | 11/2001 | Ozawa et al. .............. 180/68.4 |

FOREIGN PATENT DOCUMENTS

| | | |
|---|---|---|
| EP | 1352810 | 10/2003 |
| JP | 2001-122157 | 5/2001 |

OTHER PUBLICATIONS

English language Abstract of JP 2001-122157.

* cited by examiner

*Primary Examiner*—Kiran B. Patel
(74) *Attorney, Agent, or Firm*—Greenblum & Bernstein, P.L.C.

(57) ABSTRACT

A coupling structure for an air guide of a front end module includes a plurality of rib members formed at a lateral portion of the front end module, at least one support ribs protruding from a fixing surface of the air guide, and a plurality of insert blades extending at a right angle at one end of the respective support ribs. Each of the rib members is formed about an associated guidance recess, and includes a pair of lateral ribs protruding from opposite lateral sides of the guidance recess, and a pair of front ribs extending from distal ends of the lateral ribs toward each other. The support ribs are configured to be inserted along the guidance recesses of the rib members, respectively, and in such an inserted state of the support ribs, the insert blades connected thereto come into contact with inner surfaces of the front ribs of the rib members.

4 Claims, 4 Drawing Sheets

COUPLING STRUCTURE FOR AIR GUIDE OF FRONT-END MODULE

RELATED APPLICATIONS

The present disclosure relates to subject matter contained in Korean Application No. 10-2004-43177, filed on Jun. 11, 2004, which is herein expressly incorporated by reference in its entirety.

BACKGROUND OF THE INVENTION

1. Field of the Invention

The present invention relates in general to a coupling structure for an air guide of a front-end module, and more particularly to a coupling structure for an air guide, which enables the air guide to be coupled to a front-end module of a front body frame of an automotive vehicle with reduced element cost and shortened assembly time, resulting in improved assembly productivity.

2. Description of the Related Art

In general, an automotive vehicle body is frontwardly provided with a front-end module, and into the front-end module is rearwardly integrated a cooling system, including a radiator. Upon traveling or parking an automotive vehicle, in order to assure that inlet air flowing through a front bumper is sufficiently supplied to the cooling system, the front-end module is provided with plate-shaped air guides.

Conventionally, the air guides are bolted to the front-end module, but this results in a disadvantageous increase in element cost and complications to the assembly process.

SUMMARY OF THE INVENTION

Therefore, the present invention has been made in view of the above problems, and it is an object of the present invention to provide a simplified coupling structure for an air guide of a front-end module, which can reduce both element cost and assembly time, resulting in improved assembly productivity.

In accordance with the present invention, the above and other objects can be accomplished by the provision of a coupling structure for an air guide of a front-end module provided in an automotive vehicle, comprising rib members formed at a lateral portion of the front-end module, each rib member, formed around an associated guidance recess, including a pair of lateral ribs protruding from opposing lateral sides of the guidance recess, and a pair of front ribs extending from distal ends of the lateral ribs toward each other; support ribs protruding from a fixing surface of the air guide so that each support rib is inserted along the guidance recess of the respective rib members; and insert blades bent at a right angle at one end of the respective support ribs so as to come into contact with inner surfaces of the front ribs.

Preferably, the coupling structure may further comprise pressure protrusions protruding from outer surfaces of the front ribs so that they compress the fixing surface of the air guide with a constant pressure, thereby achieving an interference-fitting structure in a state in which the front ribs are fixedly maintained between the insert blades and the fixing surface of the air guide.

Preferably, the coupling structure may further comprise; guide rails protruding from the front-end module and located on an extension line of the guidance recesses; and guide protrusions protruding from the fixing surface of the air guide so as to be moved along the guide rails and the guidance recesses.

Preferably, the coupling structure may further comprise reinforcing ribs protruding from outer surfaces of the insert blades, respectively, for increasing rigidity of the insert blades.

As can be seen from the foregoing description, the simplified coupling structure for an air guide of a front-end module according to the present invention can simplify not only an assembly process, but also overall maintenance and repair, resulting in an improvement in productivity.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
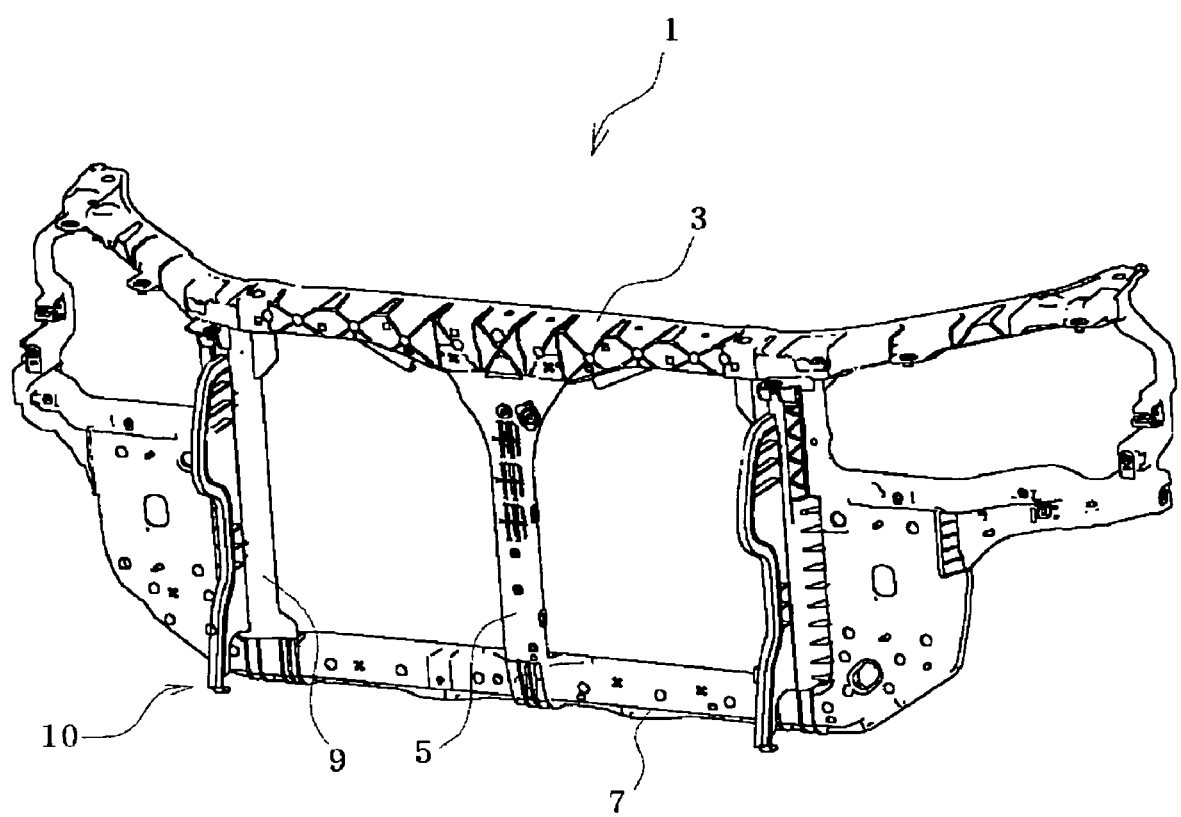
FIG. 1 is an assembled perspective view illustrating air guides of a front-end module in accordance with a preferred embodiment of the present invention.
Figure 2:
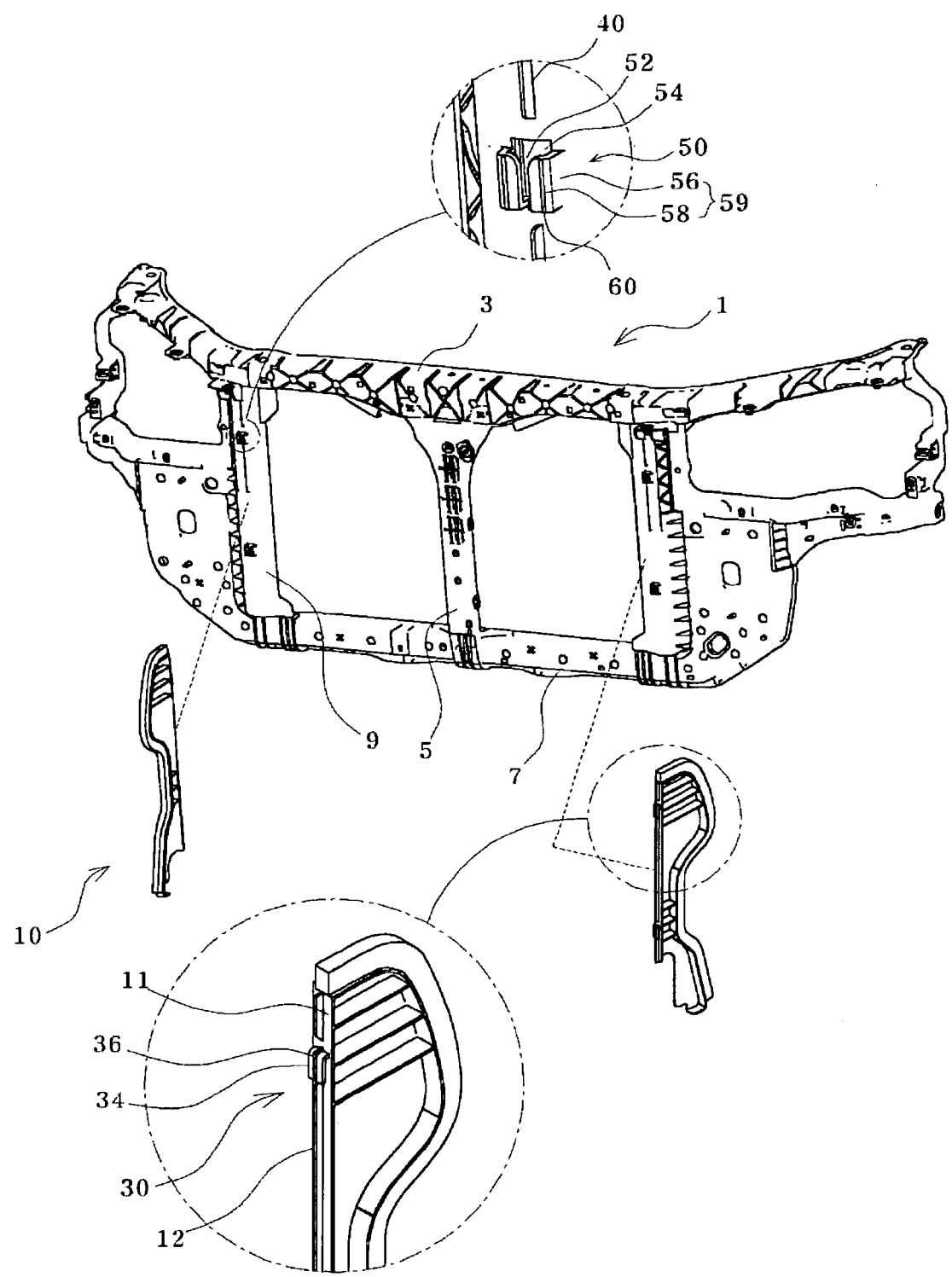
FIG. 2 is an exploded perspective view of FIG. 1.
Figure 3:
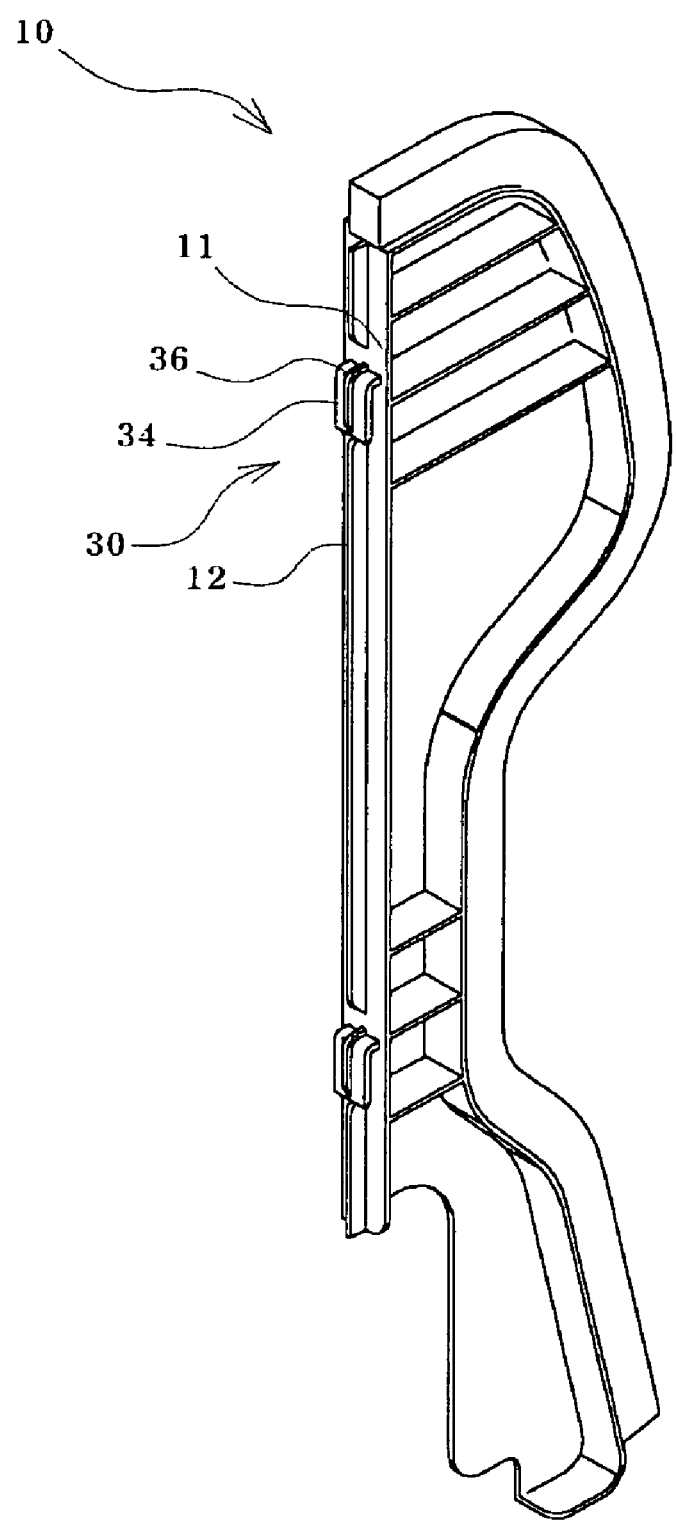
FIG. 3 is a perspective view illustrating a hook unit of the air guide shown in FIG. 1.
Figure 4:
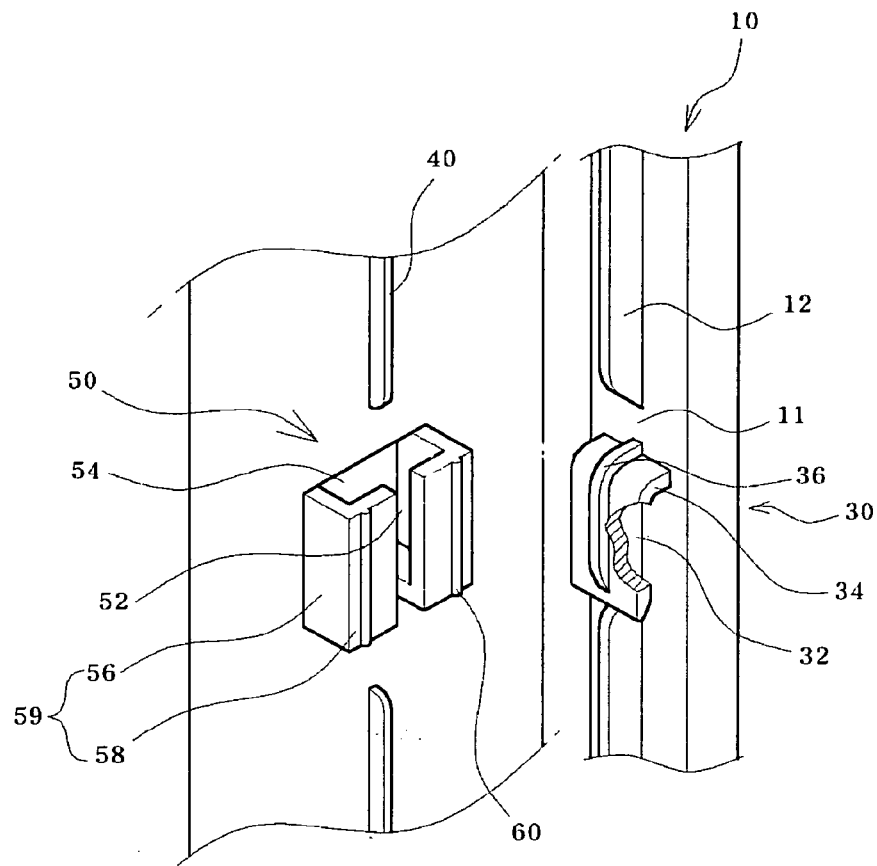
FIG. 4 is a perspective view illustrating the hook unit of the air guide and a mounting unit of the front-end module, before they are coupled, in accordance with the preferred embodiment of the present invention.
Figure 5:
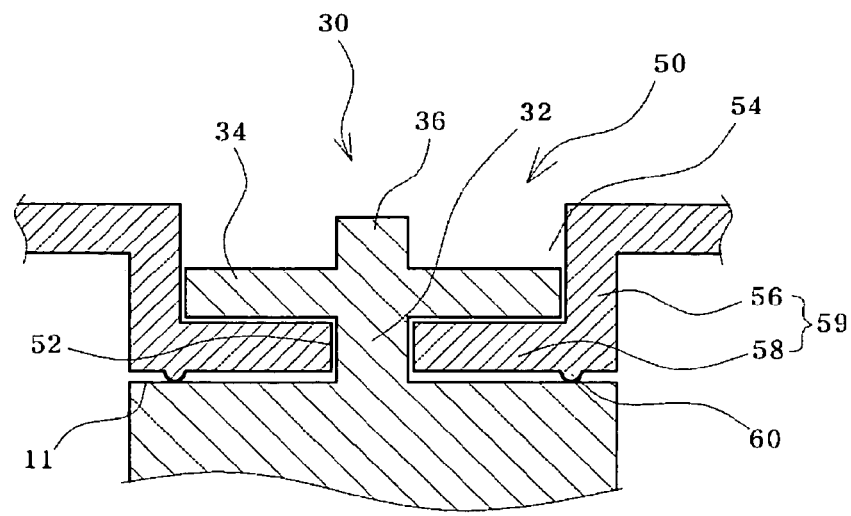
FIG. 5 is a sectional view illustrating the hook unit of the air guide coupled to the mounting unit of the front-end module in accordance with the preferred embodiment of the present invention.

FIG. 1 is an assembled perspective view illustrating air guides of a front-end module in accordance with a preferred embodiment of the present invention, and FIG. 2 is an exploded perspective view of FIG. 1. FIG. 3 is a perspective view illustrating a hook unit of the air guide shown in FIG. 1. FIG. 4 is a perspective view illustrating the hook unit of the air guide and a mounting unit of the front-end module, before they are coupled, and FIG. 5 is a sectional view illustrating the hook unit of the air guide coupled to the mounting unit of the front-end module.

As shown in FIGS. 1 and 2, a front-end module 1, which constitutes a front frame of an automotive vehicle body, is comprised of an upper support portion 3, a middle support portion 5, a lower support portion 7, and opposing lateral support portions 9.

Each of the lateral support portions 9 is mounted with an air guide 10 in accordance with a preferred embodiment of the present invention. The air guide 10 comes into contact with the lateral support portion 9 through a fixing surface 11 thereof.

From the fixing surface 11 of the air guide 10 protrude guide protrusions 12, and hook units 30. In the present embodiment, two hook units 30 are interposed between three guide protrusions 12.

Each of the hook units 30 includes: a support rib 32 which protrudes from the fixing surface 11 of the air guide 10; and an inverted L-shaped insert blade 34 which is bent at a right angle at one end of the support rib 32.

From an outer surface of the insert blade 34 protrudes a reinforcing rib 36 along an extension line of the support rib 32. The reinforcing rib 36 serves to increase rigidity of the hook unit 30.

Meanwhile, from the lateral support portion 9 of the front-end module 1 protrude guide rails 40 and mounting units 50 so as to correspond to the guide rails 40 and the hook units 30, respectively.

Each of the mounting units 50, for use in the interference fit of the hook units 30, includes: a guidance recess 52 incised frontwardly in the lateral support portion 9, and a rib member 59 formed around the guidance recess 52. The rib member 59 consists of a pair of lateral ribs 56 protruding from opposing lateral sides of the guidance recess 52, and a pair of front ribs 58 extending from distal ends of the lateral ribs 56 toward each other.

Defined by upper ends of the lateral and front ribs 56 and 58 of the rib member 59 is an insertion opening 54, and from outer surfaces of the front ribs 58 protrude pressure protrusions 60, respectively.

Now, the operation of the coupling structure for the air guide 10 of the front-end module 1 in accordance with the preferred embodiment of the present invention will be explained.

When the air guide 10 is fitted to the lateral support portion 9 from the upper side of the portion 9, the guide protrusions 12, which protrude from the fixing surface 11 of the air guide 10 toward the lateral support portion 9, are moved along the corresponding guide rails 40 and guidance recesses 52 formed at the lateral support portion 9 of the front-end module 1.

Through such a movement of the air guide 10, the hook units 30 are coupled to the mounting units 50 by interference fitting, respectively.

Explaining the interference fit in detail, the support rib 32 of the respective hook units 30 is inserted through the insertion opening 54 of the corresponding mounting unit 50, and is moved downwardly along the guidance recess 52, and accordingly, the insert blade 34 connected to the support rib 32 comes into fixed contact with inner surfaces of the front ribs 58. In this case, the outer surfaces of the front ribs 58 are fixedly maintained relative to the fixing surface 11 of the air guide 10, as the pressure protrusions 60 come into contact with the fixing surface 11.

Referring to FIG. 5, through the use of the pressure protrusions 60 formed at their outer surfaces, the front ribs 58 compress the fixing surface 11 with a constant pressure in a state whereby they are fixedly maintained by the insert blade 34 and the fixing surface 11. In this way, the air guide 10 is interference-fitted to the front-end module 1.

In such an interference-fitted state, the reinforcing rib 36 is used to increase rigidity of the insert blade 34 and the support rib 32, and thus serves as a buttress.

As apparent from the above description, the present invention provides a coupling structure for an air guide of a front-end module, which can be achieved through an interference fit without the need for separate mounting means, thereby being capable of reducing element cost as well as simplifying an assembly process, resulting in an improvement in productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A coupling structure for an air guide of a front end module configured to be provided in an automotive vehicle, comprising:
   a plurality of rib members formed at a lateral portion of the front end module, each rib member, formed about an associated guidance recess, including a pair of lateral ribs protruding from opposite lateral sides of the guidance recess, and a pair of front ribs extending from distal ends of the lateral ribs toward each other;
   at least one support rib protruding from a fixing surface of the air guide so that the support rib is insertable along the guidance recess of the respective rib members; and
   a plurality of insert blades extending at a right angle at one end of the respective support ribs so as to come into contact with inner surfaces of the front ribs.

2. The structure as set forth in claim 1, further comprising:
   a plurality of pressure protrusions protruding from outer surfaces of the front ribs and configured to compress the fixing surface of the air guide with a constant pressure, thereby providing an interference fitting structure in a state in which the front ribs are fixedly maintained between the insert blades and the fixing surface of the air guide.

3. The structure as set forth in claim 1, further comprising:
   at least one guide rail protruding from the front end module and located on an extension line of the guidance recesses; and
   at least one guide protrusion protruding from the fixing surface of the air guide so as to be moved along the guide rail and the guidance recess.

4. The structure as set forth in claim 1, further comprising:
   at least one reinforcing rib protruding from outer surfaces of the insert blades, respectively, the reinforcing rib increasing rigidity of the insert blades.

* * * * *